United States Patent [19]
Beard et al.

[11] Patent Number: 5,857,173
[45] Date of Patent: Jan. 5, 1999

[54] PRONUNCIATION MEASUREMENT DEVICE AND METHOD

[75] Inventors: Dana Beard, San Francisco; Stephen Austin, San Mateo; James Talley, Brisbane, all of Calif.

[73] Assignee: Motorola, Inc.

[21] Appl. No.: 791,124

[22] Filed: Jan. 30, 1997

[51] Int. Cl.⁶ ...................................................... G10L 3/00
[52] U.S. Cl. ......................... 704/276; 704/249; 704/254; 434/185
[58] Field of Search ............................ 434/185; 704/276, 704/249, 254, 270, 271, 241, 242, 236, 237, 231, 200

[56] References Cited

U.S. PATENT DOCUMENTS

| | | | |
|---|---|---|---|
| 4,703,504 | 10/1987 | Vitorelli | 704/254 |
| 4,969,194 | 11/1990 | Ezawa et al. | 704/276 |
| 5,487,671 | 1/1996 | Shpiro et al. | 434/185 |
| 5,562,453 | 10/1996 | Wen | 434/185 |
| 5,625,749 | 4/1997 | Goldenthal et al. | 704/254 |
| 5,634,086 | 5/1997 | Rtischev et al. | 704/270 |
| 5,679,001 | 10/1997 | Russell et al. | 434/185 |

OTHER PUBLICATIONS

Fumida Itakura, "Minimum Prediction Residual Principle Applied to Speech Recognition," IEEE Trans. Acoust. Sig. Proc. ASSP–23(1), Feb. 75, 67–72.

John R. Deller, Jr., John G. Proakis, and John H. L. Hansen, Discrete–Time Processing of Speech Signals, Prentice Hall, New Jersey (1987), 692–697.

Lee Hetherington and Michael McCandless, "SAPPHIRE: An Extensible Speech Analysis and Recognition Tool Based on Tcl/Tk," Proceeding of Fourth International conference on Spoken Language Processing. ICSLP '96 (Philadelphia), 3–6 Oct. 1996, pp. 1942–1945.

Douglas Downing and Jeff Clark, Statistics the Easy Way, Barron's Educational, New York (1983), pp. i–ix.

*Primary Examiner*—David R. Hudspeth
*Assistant Examiner*—Donald L. Storm
*Attorney, Agent, or Firm*—Thomas G. Berry

[57] ABSTRACT

Upon selection of an expression for pronunciation training, a look-up operation is performed in a speaker database (15) to obtain a predetermined model for comparison with a voice of a user received at an input (11). A speech modeling element models speech of a native speaker. The voice input is applied to the modeling element (102–107) and an analysis is carried out of the comparison, in correlation and in duration, between a phoneme or sub-word of the input and a phoneme or sub-word of the native speaker to provide a score, including a score for the correlation and a score for the duration. The score is analyzed with respect to a score for a predetermined speaker in an analysis element (40). An indicator device (16) coupled to the output of the analysis element indicates the result in a graphical illustration. A tracking tool indicates state of progress of the voice of the speaker.

16 Claims, 3 Drawing Sheets

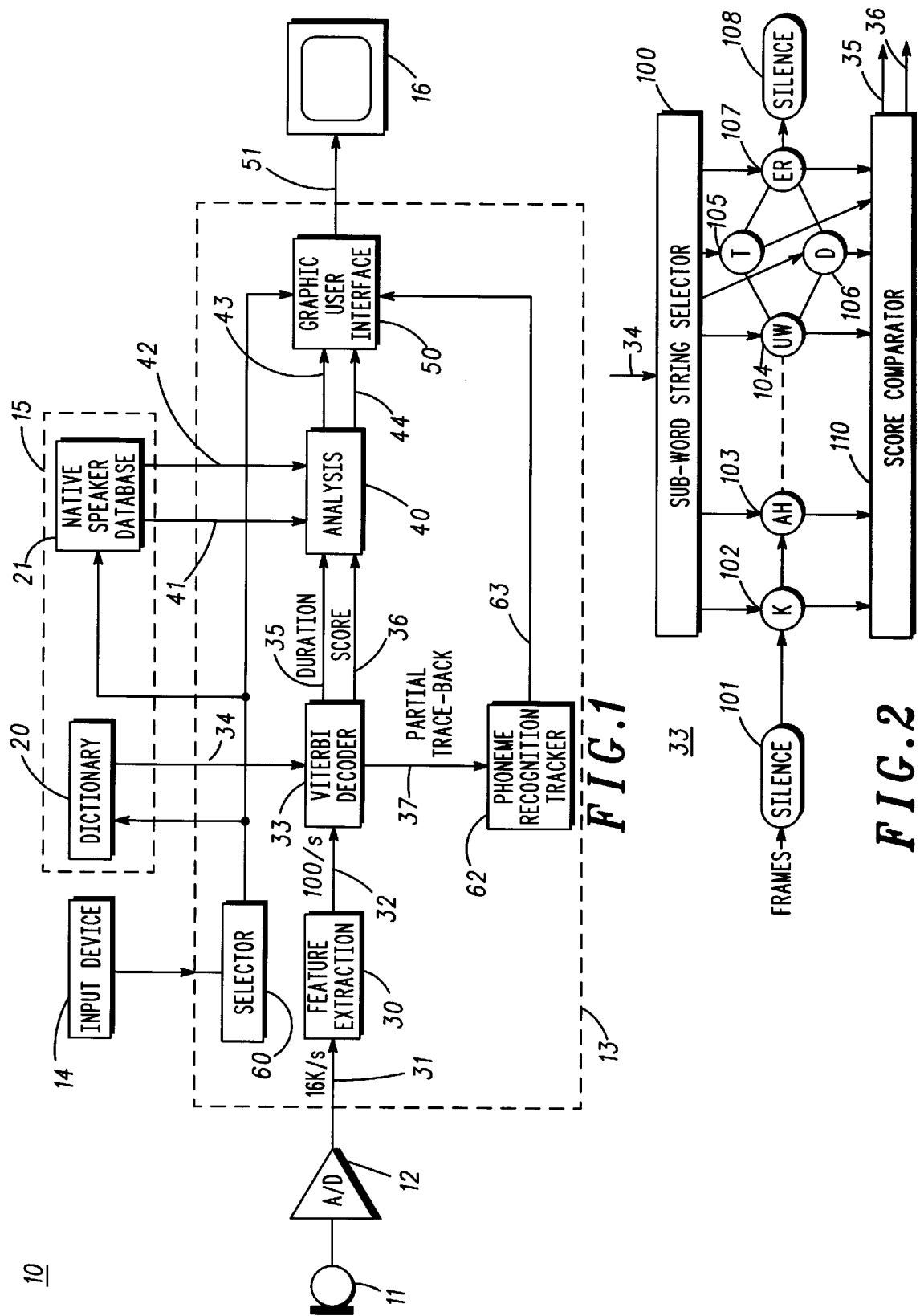

PRONUNCIATION MEASUREMENT DEVICE AND METHOD

FIELD OF THE INVENTION

This invention relates to a device for pronunciation measurement and a method of measuring pronunciation, for example for the purpose of tutoring language students.

BACKGROUND OF THE INVENTION

Voice recognition products are more and more widely available which use various schemes for comparing features of input voice with either predetermined voice templates or voice templates determined by a training process. Thus, for example, speaker independent voice recognition products compare features of received voice with predetermined templates for words such as "1", "2", etc., or word parts commonly called "phonemes" or "triphones" in the art, which can be assembled to form templates for complete words. The advantage of a speech recognition system that is based on word parts is that new words can be constructed out of the parts of templates that already exist in memory. Thus, for example, the first part of the composite template for "promise" can be combined with the last part of the template for "conduct" to form a template for the word "product". Also, voice activated word processing software is available in which a large number of composite templates are used to recognize speech input from a microphone and to display the spoken words in a word processing application.

Products such as these focus on recognizing a word, where the input word is unknown, but is one of a limited selection of words from a dictionary, or they focus on training such a recognizer by preselecting a word which a user is to speak and creating a template or model in memory for that word when the speaker speaks the word. Voice recognition devices of the types described presuppose that the speaker is reasonably able to speak the language to be recognized.

A preferred embodiment of the present invention is described, by way of example only, with reference to the drawings.

BRIEF DESCRIPTION OF THE DRAWINGS

FIG. 1 is a block diagram illustrating circuitry of a pronunciation measuring device in accordance with the preferred embodiment of the invention.

FIG. 2 illustrates details of Viterbi decoder of FIG. 1.

DETAILED DESCRIPTION OF THE DRAWINGS

Figure 3:
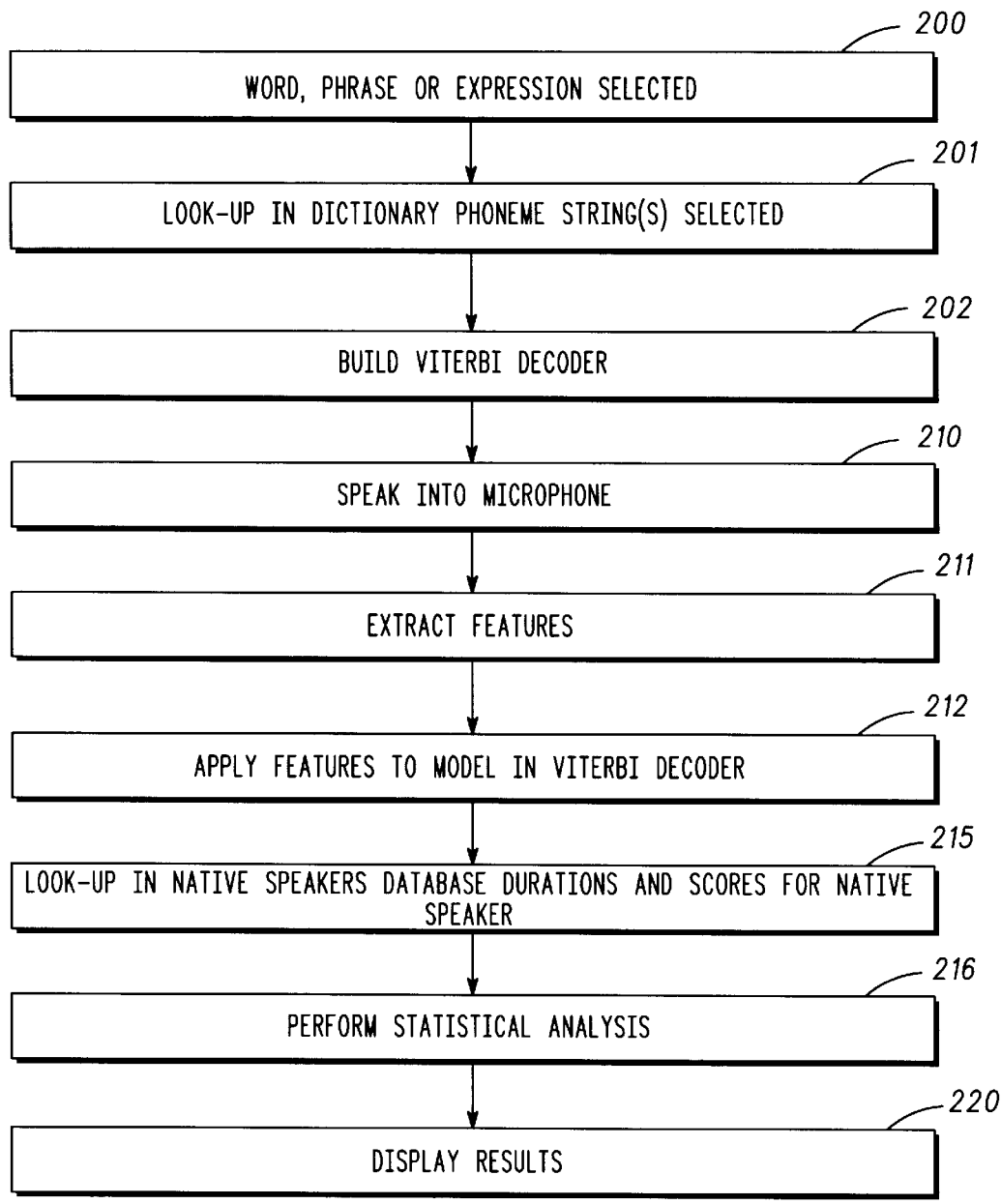
FIG. 3 is a flow diagram illustrating operation of the device of FIG. 1.

The invention calls for a speaker to utter a word or sequence of words displayed or indicated on a display device attached to a computing device. The action of the invention is to match the speaker's voice to templates corresponding to the displayed or indicated words and to measure how well the speaker has pronounced the words and to grade the words or word parts very much as a teacher would grade a student of the language in question. In contrast to voice recognition devices, this invention assumes that the speaker may not be proficient in the target language.

Referring to FIG. 1, a device 10 for pronunciation measurement is shown, which may conveniently be called a "phoneme tutor". The device comprises a microphone 11 connected to an analog-to-digital converter 12 connected in turn to an input of a microprocessor 13. Also connected to the microprocessor 13 are an input device 14, a memory 15 and a display 16. The memory 15 has a dictionary 20 of words and strings of phonemes or other sub-words for each word. Thus, for example, the word "computer" is stored in dictionary 20 and, with that word are stored two phoneme strings as follows:

k-ah-m-p-uw-t-er and k-ah-m-p-uw-d-er.

These phoneme strings represent two alternative common ways of pronouncing the word "computer". Native speaker database 21 is provided in memory 15 and comprises statistical data for different phonemes, words and sentences for a native speaker having a pronunciation the user wishes to emulate. There may also be stored in memory 15 voice synthesis data for the native speaker for synthesizing a voice that a user is to mimic.

Microprocessor 13 comprises a number of elements formed in software. These include a feature extraction element 30, having an input 31 and an output 32, a Viterbi decoder 33 having an input connected to the output of the feature extraction element 30 and having an input 34 connected to the dictionary 20, first and second outputs 35 and 36 and a partial trace-back output 37. A statistical analysis element 40 is provided having inputs coupled to the outputs 35 and 36 of the Viterbi decoder and having inputs 41 and 42 coupled to outputs of the native speaker database 21 and having outputs 43 and 44. A graphic user interface 50 in the form of a computer program is provided having inputs connected to the outputs 43 and 44 of the statistical analysis element 40 and having an output 51 coupled to the display 16. Also shown in the processor 13 is a selector 60 coupled to the input device 14 and having outputs coupled to the dictionary 20, the native speaker database 21 and the graphic user interface 50. A tracking tool 62 is provided in processor 13 having an input connected to output 37 of the Viterbi decoder and having an output 63 coupled to the graphic user interface 50.

Preferred details of the Viterbi decoder 33 are shown in FIG. 2 by way of example. The Viterbi decoder 33 comprises a sub-word string selector 100 (e.g. a phoneme string selector) coupled to the input 34 and comprises a silence model 101 and a number of phoneme models 102–107, where phoneme models 102, 103 and 104 are connected in series and where phoneme model 104 is connected to phoneme models 105 and 106 in parallel, which in turn are connected in series with phoneme model 107. Finally, a silence model 108 is added to the end of the network of models. A score comparator 110 is provided, connected to each of the phoneme models. Each of the phoneme models is built to identify a selected phoneme (or other sub-word) as illustrated within each model. FIG. 2 shows an example using the word "computer". Any other word or sequence of words can be represented in this way.

Operation of the device of FIG. 1 will be described with reference to the flow chart of FIG. 3. In Step 200, a word, phrase or other expression is selected using the input device 14. The input device 14 is, for example, a keyboard and the word "computer" can be input. This word is provided to selector 60. Selector 60 causes a look-up (step 201) in dictionary 20 and the corresponding phoneme strings described above are loaded from dictionary 20 into Viterbi decoder input 34. In Step 202, the Viterbi decoder is built and the various phoneme models 102–107 of FIG. 2 are built. At the same time, selector 60 provides the selected word to the graphic user interface 50 for display on the display 16.

The user now speaks into the microphone 11 (step 210). The analog-to-digital converter 12 digitizes the speech into a digital bit stream at, for example, 16 KBPS. Feature extraction element 30 extracts spectral features and excitation features from the digital bit stream in a manner known in the art. These features are provided to the Viterbi decoder 33 at a typical rate of 100 samples per second. These samples are provided in frames simultaneously to a subset of the various models 101–108. The frames are successively consumed by the sequence of models from left to right in the diagram according to the optimal matching path, which depends on the outcome of matching in any given model.

Each phoneme model detects its particular phoneme in the received stream of samples and provides to the score comparator 110 a first value indicative of the degree of correlation between the samples and the phoneme to be identified and a second value indicative of the duration of the phoneme. When the word is completed and the silence model 101 detects silence at the end of the word, score comparator 110 provides these values to statistical analysis element 40.

Selector 60 causes another look-up operation to be performed, this being in the native speaker database 21, causing statistical data for the word in question ("computer") to be input to inputs 41 and 42 of statistical analysis element 40. For each phoneme of the word in question, a target mean and variation for the duration of that phoneme and a target mean and variation for the score of the phoneme are input to inputs 41 and 42 respectively. This step is illustrated as step 215 in FIG. 3, but it will be appreciated that this step can be performed simultaneously with step 201.

Statistical analysis of the output from the Viterbi decoder 33 is performed in step 216 of FIG. 3 as follows. For the duration of a particular phoneme, the value output from output 35 is compared with the target mean duration for that phoneme at input 41. The difference between the measured duration and the target mean duration is calculated and is divided by the variance at input 42 for the duration of the phoneme for the native speaker. The result is a confidence level for the duration measured. If the measured duration is close to the mean duration the confidence level will be high, but even if the duration is very different from the mean duration, a high confidence level can still be obtained if the variance for the duration of the phoneme as spoken by the native speaker is high.

Similarly, the score (i.e. the correlation) for a particular phoneme is output at output 36 and is compared with the target mean score for the phoneme as spoken by the native speaker and as input at input 42 of the statistical analysis element 40. Similarly, a variation for that score is provided at input 42. The difference between the measured score and the target mean score is calculated and is divided by the variance for that score. The results gives a confidence level for the degree of correlation between the spoken phoneme and the native speaker phoneme. The confidence levels for the durations of the phonemes and the scores of the phonemes are output at outputs 43 and 44 respectively of the statistical analysis element 40. These are provided to graphic user interface 50 and the results are displayed on display 16. This displaying of the results is illustrated in FIG. 3 as step 220.

Thus the statistical analysis element 40 is a statistical comparator for constructing a grade for a signal at the output 36 or 35 of the Viterbi decoder 33 against the speaker database 21 and providing the grade as an output.

Figure 4:
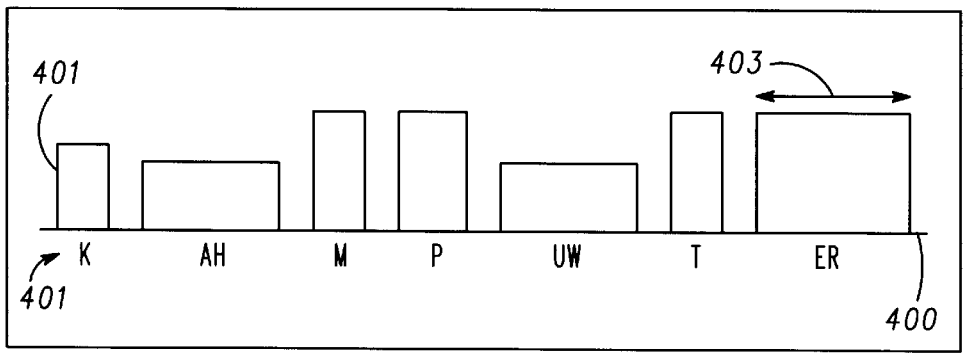
FIG. 4 is an illustration of an output on the display of the device of FIG. 1.

The graphic user interface 50 can provide an indication of the results in many different forms. An example of results displayed on display 16 is illustrated in FIG. 4. The illustration in FIG. 4 is advantageous in providing a visual indication of both the relative duration and correlation of the various phonemes. In FIG. 4, the timeline 400 is illustrated with the phonemes 401 individually listed below the timeline 400 and, for each phoneme, a rectangular bar 402 is illustrated above the timeline. The height of the bar illustrates the correlation with the phoneme of the native language speaker. Thus, a tall bar indicates a good correlation, i.e. a well pronounced phoneme and a shorter bar indicates a poorly pronounced phoneme. The length dimension of a bar 403 indicates the duration of the phoneme relative to the preferred duration of the phoneme as spoken by the native speaker. Thus, a long bar indicates excess duration in the pronunciation and a short bar indicates insufficient duration to the phoneme.

Thus, the user can easily visualize the quality of pronunciation of the word in question. In the example illustrated, for example, the vowel "AH" is relatively poorly pronounced and its duration is somewhat excessive whereas the vowel "UW" has better pronunciation and its duration is appropriate. Thus, the user is aware that improvement can be made in the pronunciation of the first vowel and that pronunciation of the second vowel is adequate.

A simple and useful device has been described above for aiding a student of a language in the study and practice of pronunciation of expressions. The tool can be adapted for the study of almost any language, merely by dividing expressions into phonemes and providing the user with an indication of the quality of pronunciation of individual phonemes. It has been described that the indication given to the user preferably includes an indication of quality of pronunciation and duration of pronunciation. It is not necessary to provide an indication of these particular aspects of pronunciation of individual phonemes and indeed alternative aspects of pronunciation can be indicated, for example pitch, emphasis etc.

The tool described can be modified and expanded to provide additional useful features. For example, whole phrases or sentences can be entered in input device 14 and illustrated in output display 16. A confidence level can be indicated for the pronunciation of a complete word or for the pronunciation of a phrase, a whole sentence or some other expression.

Figure 5:
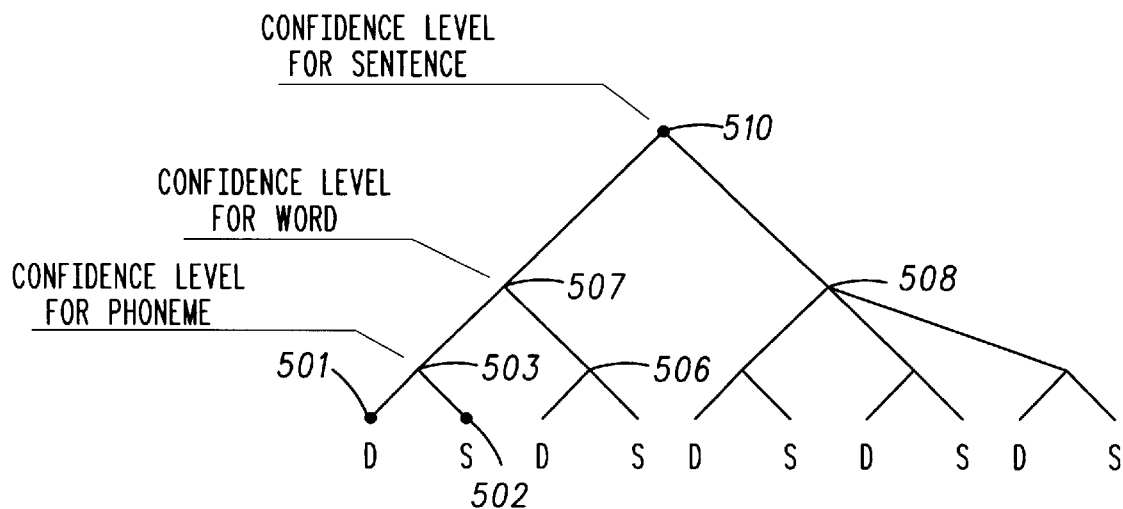
FIG. 5 is a tree diagram for illustration of particularly preferred features.

FIG. 5 illustrates a manner of providing a confidence level for phonemes, words and sentences. A tree is illustrated in which a confidence level 501 for the duration of a phoneme and a confidence level 502 for the score of a phoneme are combined into a single confidence level 503 for the phoneme. This confidence level for the phoneme is combined with a confidence level 506 for another phoneme in a word. Together these confidence levels provide a confidence level 507 for the two-phoneme word. The confidence level 507 can be combined with a confidence level 508 of another word to provide a confidence level 510 for the combination of words or indeed a confidence level for a complete sentence. Of course, the tree illustrated in FIG. 5 is merely illustrative of a larger tree for a complete phrase or sentence.

In FIG. 1 there has been illustrated a tracking tool 62 which is now described in greater detail. The tracking tool 62 is an optional feature which provides a user with an indication of the progress through the pronunciation of a sentence. The output 37 of the Viterbi decoder indicates to the tracking tool 62 how far through the scoring of the word the Viterbi decoder has progressed. As each phoneme model 102, 103 etc. of FIG. 2 detects its particular phoneme and completes the detection of that phoneme, and as the next phoneme model begins to detect the following phoneme, a partial traceback indication is given to tracking tool 62 indicating the completion of detection of one phoneme and the commencement of detection of the next phoneme. Tracking tool 62 relates this progress to the word of the sentence being pronounced. Tracking tool 62 gives an indication at output 63 to the graphic user interface 50 of this progress. An example is illustrated in FIG. 6.

Figure 6:
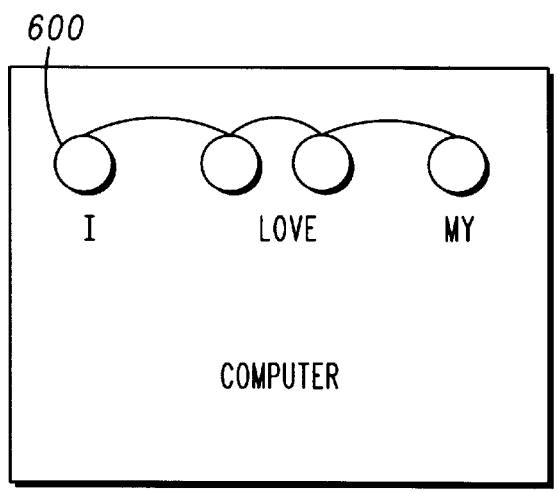
FIG. 6 is an illustration of a graphic user interface illustrating a particularly preferred feature.

In FIG. 6, there is illustrated a display output on the display 16 with the expression "I love my computer" as being the sentence input into input device 14 and being pronounced by the user. As tracking tool 62 indicates to graphic user interface 50 the progress of the user's activity in pronouncing the sentence, graphic user interface 50 generates a bouncing ball 600 which appears to bounce from syllable to syllable as the user pronounces the sentence. The bouncing of the ball from syllable to syllable or other suitable progress indicator is initiated by the output 63 from the tracking tool 62.

A method of measuring pronunciation and a device for pronunciation measurement have been described, by way of example only, and modifications of detail may readily be made by one skilled in the art without departing from the scope and spirit of the invention.

We claim:

1. A method of measuring pronunciation, comprising:

receiving voice input and processing the voice input to provide a plurality of voice input phonemes;

performing a look-up operation to obtain a predetermined model for the voice input, wherein the predetermined model comprises a plurality of model phonemes;

applying the voice input to the model by comparing the voice input phonemes with the model phonemes to provide a score;

analyzing the score with respect to a score for a predetermined speaker, including comparing a duration of at least one voice input phoneme with a duration of at least one model phoneme, thereby providing a result; and indicating the result including indicating a confidence measure for the duration of the at least one voice input phoneme.

2. The method of claim 1, further comprising a step of selecting an expression, wherein the step of performing the look-up operation comprises obtaining from a memory a predetermined model for the expression selected.

3. The method of claim 1 wherein the step of applying the voice input to the model to provide a score comprises providing a first output providing measurements of durations of sub-words and a second output providing measurements of correlations between sub-words in the voice input and sub-words in the predetermined model.

4. A method of measuring pronunciation, comprising:

receiving voice input;

performing a look-up operation to obtain a predetermined model for the voice input;

applying the voice input to the model to provide a score, including providing a first output providing measurements of durations of sub-words and a second output providing measurements of correlations between sub-words in the voice input and sub-words in the predetermined model;

analyzing the score with respect to a score for a predetermined speaker, thereby providing a result wherein the step of analyzing the score comprises performing statistical analysis of the first output with respect to predetermined measurements of durations of sub-words for the predetermined speaker; and indicating the result, including indicating a confidence measure for durations of sub-words in the voice input.

5. The method of claim 4, wherein the step of indicating the result comprises providing a graphical illustration of a result of the statistical analysis.

6. The method of claim 3 wherein the step of analyzing the score comprises performing statistical analysis of the second output with respect to predetermined measurements of correlations between sub-words of the predetermined speaker and sub-words in the predetermined model.

7. The method of claim 6, wherein the step of indicating the result comprises providing a graphical illustration of a result of the statistical analysis.

8. A device for pronunciation measurement comprising:

a speech modeling element having an input to receive a signal representing a voice of a speaker and an output;

a speaker database;

an analysis element having a first input coupled to the speaker database and a second input coupled to the output of the speech modeling element and having an output; and a graphic user interface indicator device coupled to the output of the analysis element, including an indicator of confidence measure for a duration of a phoneme of the voice of the speaker and an indicator of a confidence measure for quality of a phoneme of the voice of the speaker.

9. The device of claim 8, wherein the speech modeling element comprises a memory element having stored therein a plurality of predetermined models representative of different expressions.

10. The device of claim 9, further comprising a selection input device coupled to the speech modeling element to select an expression for which pronunciation is to be measured.

11. The device of claim 8, wherein the speech modeling element is a sub-word modeling element.

12. The device of claim 11, wherein the sub-word modeling element is a phoneme modeling element.

13. The device of claim 11, wherein the speech modeling element employs a Viterbi decoder.

14. The device of claim 8, wherein the speech modeling element comprises a first output providing duration measurements and a second output providing correlation measurements.

15. The device of claim 8, wherein the graphic user interface includes a tracking tool indicating an expression to be spoken and indicating state of progress of the voice of the speaker through the expression to be spoken.

16. The device of claim 8, wherein the analysis element comprises a statistical comparator for constructing a grade for a signal at the second input against the speaker database and providing the grade as an output.

* * * * *